Aug. 6, 1957 A. W. KEEN 2,802,046

TELEVISION RECEIVING APPARATUS

Filed March 19, 1951 2 Sheets-Sheet 1

Inventor
ARTHUR WILLIAM KEEN
By Ralph E. Atherton
Attorney

Inventor
ARTHUR WILLIAM KEEN
By Ralph E. Atherton
Attorney 2,802,046
Patented Aug. 6, 1957

2,802,046

TELEVISION RECEIVING APPARATUS

Arthur William Keen, Twickenham, England, assignor to Electric & Musical Industries Limited, Hayes, England, a company of Great Britain Application March 19, 1951, Serial No. 216,297
Claims priority, application Great Britain March 24, 1950
6 Claims. (Cl. 178—7.5)

This invention relates to television receiving apparatus. In television receivers it is the practice for the picture to be reconstituted by means of a cathode ray tube, the beam of which scans the screen under the control of line and frame deflecting circuits operated by line and frame synchronising pulses transmitted with the picture signals, there being an odd number of lines to each complete picture and each picture being presented in the form of two frames, the lines of one frame being interlaced with the lines of the other. In order that the frame deflections of the beam may be accurately synchronized with the line deflection so as to provide correct interlacing very precise relative timing of the line and frame synchronising pulses is necessary, and this timing is liable to be affected by interference, which as is known tends to vary the times at which the frame synchronising pulses are effective to operate the frame deflecting circuit.

The object of the present invention is to provide a television receiver in which synchronism between the line and frame deflections is less dependent than in previously proposed receivers on accurate synchronising of the line and frame synchronising pulses and is less liable to be disturbed by interference.

According to the invention means are provided whereby the frame deflections are effected by locally generated control pulses which are synchronous with the line synchronising pulses and are fed to the frame deflecting circuit via a gating device which is arranged to be opened at appropirate times under the control of the frame synchronising pulses.

In one arrangement according to the invention means are provided for generating two series of control pulses, each at the line frequency, the pulses in each series occurring at half line periods after the pulses in the other series, and being fed to said gating devices via further gating devices which are opened alternately when the frame deflecting circuit operates. In this way alternate operations of the frame deflecting circuit occur at the end of a line period and at the middle of a line period, as is required in the present system in which each complete picture is made up from an odd number of lines.

Figure 1:
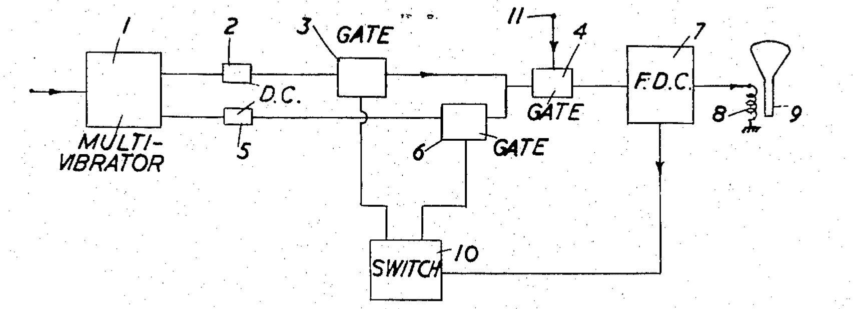
Figure 2:
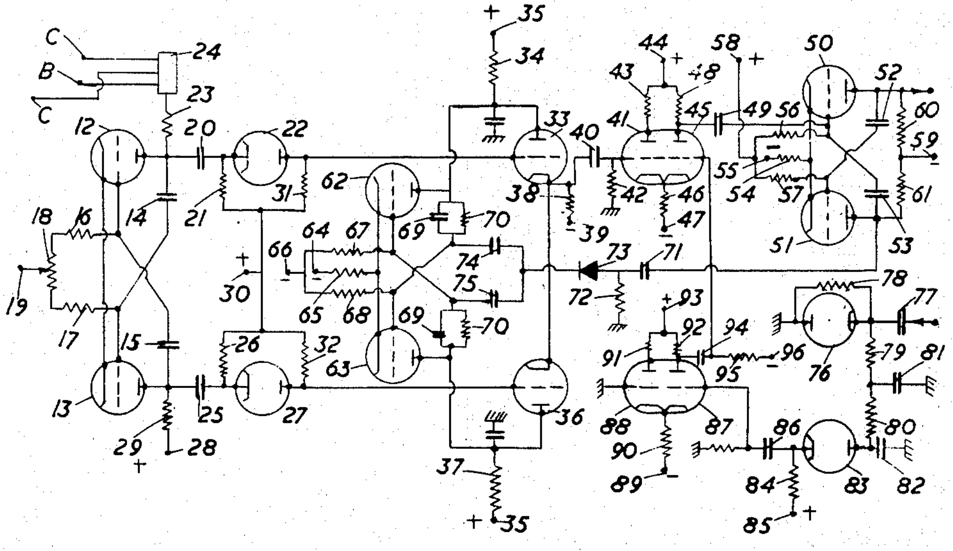
Figures 3, 4:
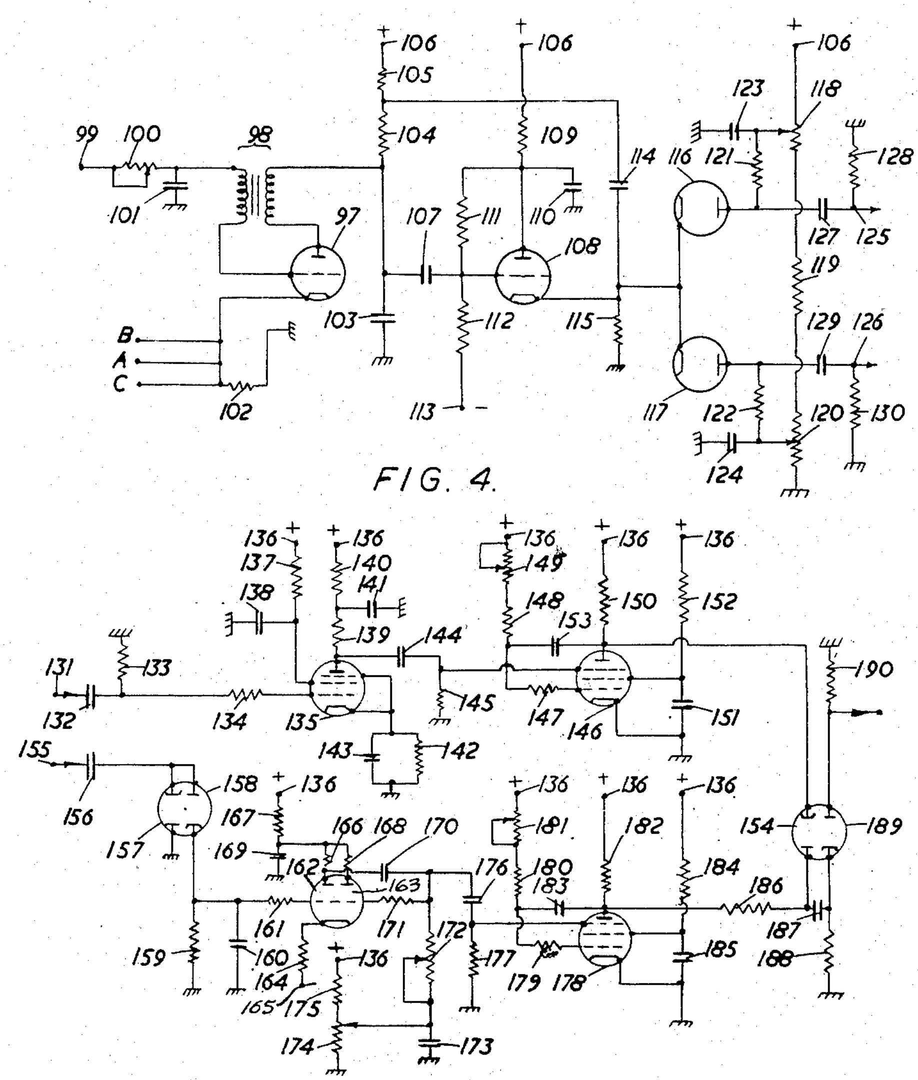

In order that the said invention may be clearly understood and readily carried into effect, the same will now be more fully described with reference to the accompanying drawings, in which:

Figure 1 is a block diagram of part of a television receiver embodying the invention, Figure 2 shows a practical circuit corresponding to Figure 1, Figure 3 shows a circuit according to another embodiment of the invention, and Figure 4 shows a circuit according to yet another embodiment of the invention.

Referring to Figure 1 a frequency control voltage is fed to a multivibrator 1 having two output circuits and adapted to perform a complete cycle at the frequency of the line synchronising pulses and adapted to provide in each output circuit square wave oscillations at the line frequency, the oscillations in one output circuit being displaced in time with respect to the oscillations in the other output circuit by half a line period. Said frequency control voltage serves to maintain the multivibrator in synchronism with the line synchronising pulses. The oscillations in one output circuit are fed to a differentiating circuit 2, thereby producing control pulses of relatively short duration, which are fed to a gating device 3, the output of which is fed to a gating device 4, and the oscillations in the other output circuit are fed to a differentiating circuit 5, thereby producing further control pulses of relatively short duration which are fed to a gating device 6, the output of which is also fed to gating device 4. The output of gating device 4 is fed to a frame deflecting circuit 7, the output of which is applied to the frame deflecting coils 8 of a cathode ray tube 9. Each time the circuit 7 is operated to deflect the beam of the cathode ray tube a switching pulse is generated, which is fed to a switch 10 which controls gating devices 3 and 6 in a manner to be described. Frame synchronising pulses derived from the received television signals are fed to gating device 4 via terminal 11 to open it periodically.

The operation is as follows:

The control pulses from the differentiating circuits 2 and 5 can reach the frame deflecting circuit 7 only when gate 4 is opened by a frame synchronising pulse, that is to say, at the end of a frame scan. When gating device 4 is opened by a frame synchronising pulse, a group of control pulses from one or other of gating devices 3 and 6 is fed to the frame deflecting circuit 7, and circuit 7 accordingly operates at the end of a line period or at the mid-point of a line period according to whether the control pulse which operates circuit 7 comes from gating device 3 or 6. Gating devices 3 and 6 are arranged to open alternately under the control of switch 10, which is operated as stated by a switching pulse fed to it from the circuit 7 each time the latter operates. Thus, when circuit 7 has been operated by a control pulse from gating device 3 so as to operate for example at the end of a line period, switch 10 is operated by a switching pulse so as to close gating device 3 and open gating device 6, so that when gating device 4 next opens circuit 7 is operated by a control pulse from gating device 6, that is to say at the mid-point of a line period. Since the control pulses which cause circuit 7 to operate are synchronised with the line synchronising signals, the operations of circuit 7 are synchronised with the line synchronising pulses so that the line and frame deflections of the cathode ray beam are synchronised. It will be observed that the frame synchronising pulses from source 11 are not employed for operating the frame deflecting circuit but serve merely to enable a control pulse to be fed from gating device 3 or 6 to circuit 7 at appropriate times. The timing of the frame deflections is much less likely to be affected by interference than in circuits in which the frame deflecting circuits are operated directly by the frame synchronising pulses. The frame synchronising pulse train is generally of three or four line periods duration and the gating device 4 is opened at the end of each frame scan for the whole of this duration.

Referring to Figure 2, which shows a practical circuit corresponding to Figure 1, the circuit includes electron discharge tubes 12 and 13, the anode of tube 12 being connected via a condenser 14 to the control electrode of device 13, and the anode of tube 13 being connected via a condenser 15 to the control electrode of tube 12. Tubes 12 and 13 are provided with grid leak resistors 16 and 17 respectively which are connected to the ends of a resistor 18. Said tubes 12 and 13 and condensers 14 and 15 constitute a multivibrator corresponding to the multivibrator of Figure 1, and the above-mentioned frequency control voltage is fed from a source 19 to an adjustable tapping on resistor 18 as shown. The anode of tube 12 is connected, via a differentiating circuit, formed by a condenser 20 and a resistor 21 and corresponding to the differentiating circuit 2 of Figure 1, to the cathode of a diode 22, and said anode is also connected via a load resistor 23 and a delay network 24 to a positive H. T. terminal (not shown). The anode of tube 13 is connected, va a differentiating circuit formed by a condenser 25 and a resistor 26 and corresponding to the differentiating circuit 5 of Figure 1, to the cathode of a diode 27, and to a positive H. T. terminal 28 via a load resistor 29. Resistors 21 and 26 are connected to a source 30 of variable positive potential to which are also connected the load resistors 31 and 32 of the diodes 22 and 27 respectively. The anode of diode 22 is connected to the control electrode of an electron discharge tube 33, the anode of which is connected via a load resistor 34 to a positive terminal 35, and the anode of diode 27 is connected to the control electrode of an electron discharge tube 36 the anode of which is connected via a load resistor 37 to terminal 35. The cathodes of tubes 33 and 36, which correspond respectively to the gating devices 3 and 6 of Figure 1, are both connected, via a blocking condenser 40 to the control electrode of an electron discharge tube 41, which is provided with a grid leak resistor 42. The anode of tube 41 is connected via a load resistor 43 to the positive H. T. terminal 44, and the cathode thereof is connected to the cathode of an electron discharge tube 45, shown as having a common envelope with tube 41, said cathode being connected via a resistor 46 to a negative terminal 47. The anode of tube 45 is connected via a load resistor 48 to positive terminal 44. Tubes 41 and 45 together form a gating device corresponding to the gating device 4 of Figure 1. The anode of tube 45 is connected via a blocking condenser 49 to the control electrode of an electron discharge tube 50, which together with an electron discharge tube 51 forms a multivibrator corresponding to the frame deflecting circuit 7 of Figure 1, the anode of tube 50 being connected to the control electrode of tube 51 by a condenser 52 and the anode of tube 51 being connected to the control electrode of tube 50 by a condenser 53, and the cathodes of tubes 50 and 51 being connected via a resistor 54 to a negative voltage terminal 55. The control electrodes of tubes 50 and 51 are connected via resistors 56 and 57 respectively to a variable positive terminal 58 for frequency control and the anodes of said tubes are connected to a positive terminal 59 via resistors 60 and 61 respectively. The switch corresponding to the switch 10 of Figure 1 comprises a pair of electron discharge tubes 62 and 63 the cathodes of which are connected to a negative terminal 64 via a resistor 65 and the control electrodes of which are connected to negative terminal 66 via resistors 67 and 68 respectively. The anode of each tube is connected to the control electrode of the other tube via a circuit comprising a condenser 69 and resistor 70 in parallel. The anode of tube 51 is connected to the control electrodes of tubes 62 and 63 via a differentiating circuit formed by a condenser 71 and a resistor 72, a rectifier 73 and blocking condensers 74 and 75. The means for feeding frame synchronising signals to the circuit comprises a diode 76 to which mixed line and frame synchronising signals are fed from the synchronising pulse separator (not shown) of the receiver via a condenser 77. The anode and cathode of diode 76 are connected by resistor 78 and the cathode is connected via an integrating network formed by resistors 79 and 80 and condensers 81 and 82 to the anode of a diode 83 the cathode of which is connected via a resistor 84 to a positive terminal 85 and via a condenser 86 to the control electrode of an electron discharge tube 87 which has an envelope in common with an electron discharge tube 88. The cathodes of tubes 87 and 88 are connected to a negative terminal 89 via a resistor 90 and the anodes are connected via resistors 91 and 92 respectively to a positive terminal 93. The control electrode of tube 88 is grounded. The anode of tube 87 is also connected via a blocking condenser 94 and resistor 95 to a negative terminal 96, and the junction of condenser 94 and resistor 95 is connected to the control electrode of tube 45.

In operation the multivibrator comprising tubes 12 and 13 operates to set up two trains of square waves at line frequency, the waves in one train being 180° out of phase with respect to the waves in the other train. The trains of square waves are converted by the differentiating circuits 20, 21 and 25, 26 respectively into trains of positive and negative pulses of relatively short duration, and said pulses are fed to the diodes 22 and 27 which eliminate the positive pulses so that only negative pulses exist across the load resistors 31 and 32. Accordingly a train of negative pulses of line frequency is fed to the control electrode of tube 33 and another train of negative pulses at line frequency but displaced in time by half a line period from the first-mentioned train of pulses is fed to the control electrode of tube 36. Tubes 33 and 36 in the arrangement shown operate as cathode followers so that as the tubes 33 and 36 are rendered alternately conducting in a manner to be described pulses occur across resistor 38 at line frequency, said pulses coming alternately for periods of one frame from tubes 33 and 36. The mixed line and frame synchronising pulses fed via condenser 77 are D. C. restored by the diode 76 and are integrated by the network 79, 80, 81, 82 whereby to effect amplitude separation of the frame synchronising pulses from the line synchronising pulses and to build up each train of frame pulses into a single pulse which is amplified, squared and inverted by the double triode 87, 88 the output of which is employed to render the gating device formed by tubes 41 and 45 periodically conducting. The diode 83 serves to prevent spurious interference pulses from exceeding the amplitude of the framing pulses generated by the integrating circuit. When the gating device 41, 45 is rendered conducting the pulses developed across resistor 38 are amplified by the gating device and the amplified pulses are fed to the control electrode of tube 50 whereby to trigger the frame frequency multivibrator formed by tubes 50 and 51. The output of tube 50 is employed to drive the generator (not shown) of the sawtooth pulses employed for effecting frame deflections of the beam of the cathode ray tube, and the output of tube 51 is employed to control the switch comprising tubes 62 and 63. Alternatively the multivibrator comprising tubes 50 and 51 may be adapted for providing a frame frequency sawtooth wave. Said switch (62, 63) controls the anode voltages of tubes 33 and 36 in such manner that the pulses fed to the switch from tube 51 render the tubes 33 and 36 alternately conducting. Thus upon the occurrence of a framing pulse which renders the gating device 41, 45 conducting pulses at line frequency are fed to the multivibrator 50, 51 either from tube 33 or 36 according to which of the latter tubes is in a conducting condition. When, for example, a frame deflection has been initiated by a pulse derived from tube 33, the switch 62, 63 renders tube 33 non-conducting and renders tube 36 conducting so that upon the occurrence of the next frame pulse applied to tube 45 the multivibrator 50, 51 is triggered by a pulse derived from tube 36 and since the pulses derived from tube 33 are displaced in time by half a line period with respect to the pulses derived from tube 36 each of the frame deflections will be initiated at appropriate times to provide interlacing of the frames.

The adjustable tapping on resistor 18 via which the automatic frequency control voltage is fed to the multivibrator 12, 13 enables the degree of interlace of the frames to be adjusted. Such adjustment may be necessary for example if the components of the multivibrator, for example the tubes 12 and 13, are not exactly matched in which case the lines of the picture may not be exactly uniformly spaced. By adjusting said tapping the lines of one frame can be adjusted relatively to the lines of the other frame.

The output of tube 12 is also employed to initiate the line deflections of the beam of the cathode ray tube, for which purpose the pulses in the output circuit of tube 12 are fed via the resistor 23 to the network 24 which sets up line scanning pulses which are fed to the line deflecting circuit (not shown). The network 24 may serve, as described in the specification of co-pending British patent application No. 10,109/50, to generate groups of three pulses, at the tappings A, B and C, the centre pulse of each group being employed for driving the line scanning circuit and the other two pulses serving to synchronise the line scanning with the received line synchronising pulses and to develop the frequency control voltage which as above-mentioned is applied to resistor 18, whereby the pulses generated by the multivibrator 12, 13 are synchronised with the line synchronising pulses.

If desired, the differentiating circuits 20, 21 and 25, 26 (Figure 2) may be omitted, the square wave oscillations being then employed as the control pulses. For various reasons, however, it is preferred to convert the square waves into pulses of relatively short duration and to employ said pulses as the control pulses as hereinbefore described.

In the above-described arrangement the control pulses which serve to initiate the frame deflections are generated by means of the multivibrator 12, 13 and such an arrangement is suitable for use with a line scanning circuit of the pulse-driven type such for example as that described in the specification of co-pending U. S. application Serial No. 181,136. In the case of more conventional scanning circuits, however, it may be preferred to employ instead of the multivibrator referred to a circuit capable of providing an output of sawtooth waveform. In one circuit for this purpose a pair of electron discharge tubes may be provided which are differently biassed and to which a sawtooth voltage of suitable slope and frequency is applied whereby said tubes become operative at different times to provide pulses, the pulses provided by one tube serving to initiate the even frames of the constituted picture and the pulses provided by the other tube serving to initiate the odd frame deflections. A circuit serving to operate in this way is shown in Figure 3. Referring to this figure, the circuit comprises an electrode discharge tube 97 the anode and control electron of which are coupled by a transformer 98 so that the tube 97 operates as a conventional blocking oscillator, the frequency of the oscillator being controlled by a frequency control voltage derived from a suitable source represented by the terminal 99 and applied to the control electrode of tube 97 via a variable resistor 100 and a shunt condenser 101. The cathode circuit of tube 97 includes a network represented by the resistor 102 and as described in the specification of co-pending British patent application No. 10,109/50 groups of three pulses are developed in the cathode circuit, the centre pulse of each group being employed for driving the line scanning circuit and the other two pulses of each group serving to synchronise the line scanning as described in connection with Figure 2. The blocking oscillator develops a large amplitude sawtooth voltage in positive sense across the condenser 103 which with the resistor 104 forms an integrating circuit in the anode circuit of tube 97. Resistor 105 serves as the anode load resistor of tube 97 and is connected to a positive H. T. terminal 106. In order to linearise the sawtooth voltage it is fed via a condenser 107 to the control electrode of an electron discharge tube 108 the anode of which is connected to terminal 106 via a resistor 109 and is provided with a by-pass condenser 110 and which is connected to the control electrode of tube 108 via a resistor 111. Said control electrode is connected via a leak resistor 112 to a negative terminal 113. A condenser 114 is connected between the junction of resistors

104 and 105 and the cathohde of tube 108, said cathode being connected to ground via a resistor 115 and to the cathodes of a pair of diodes 116 and 117. A potentiometer comprising resistors 118, 119 and 120 connected in series between terminal 106 and ground is provided. The anode of diode 116 is connected via a load resistor 121 to a variable tapping on resistor 118 and the anode of diode 117 is connected via a lead resistor 122 to a variable tapping on the resistor 120. The diode anodes are connected to output terminals 125 and 126 via differentiating circuits formed respectively by a condenser 127 and a resistor 128 and a condenser 129 and a resistor 130.

In the operation of the circuit of Figure 3, the sawtooth voltage developed across condenser 103 is linearised by the linearising circuit comprising tube 108 and is fed to the cathodes of diodes 116 and 117. The tappings on resistors 118 and 120 are adjusted so as to bias the diodes 116 and 117 in such manner that the diodes which are normally conducting, are rendered non-conducting in turn by the sawtooth voltage applied to the cathodes of the diodes at the instant when the sawtooth voltage becomes equal to the bias applied to each diode. When each diode becomes conducting a stepped voltage change occurs across the load resistor 121 or 122 as the case may be and this voltage change is differentiated by the differentiating circuits referred to, so that trains of pulses are generated at the terminals 125 and 126, the frequency and amplitude of the sawtooth voltage being such that the pulses in each train occur at line frequency and the pulses in one train are displaced in time by half a line period with respect to the pulses in the other train. The trains of pulses may be fed to gating devices corresponding to the gating devices 3 and 6 of Figure 1 such for example as the tubes 33 and 36 of Figure 2. The circuit may in fact be similar to that shown in Figure 2 with the exception of the above described arrangement for providing the two trains of pulses at line frequency.

Instead of employing a pair of diodes which are differently biassed and are arranged to be conducting at different times by the application of a sawtooth voltage to them, a single electron discharge tube, for example a diode, may be employed which is arranged to become operative to produce pulses with a varying timing by the application to said tube of sawtooth voltages of different frequencies. A circuit embodying this arrangement is shown in Figure 4. Referring to Figure 4, line synchronising pulses obtained from the line synchronising circuit represented by terminal 131 are fed via a condenser 132 and resistor 133 and a grid resistor 134 to the control electrode of an electron discharge tube 135 of the pentode type. The screen electrode of tube 135 is connected to a positive H. T. terminal 136 via a resistor 137 and is provided with a by-pass condenser 138. The anode is connected to terminal 136 via resistors 139 and 140 the junction of which is connected to ground via a by-pass condenser 141. The suppressor electrode is connected to the cathode which is connected to ground via a resistor 142 and shunt condenser 143. The pulses are amplified and inverted by tube 135 and are fed via a blocking condenser 144 and a resistor 145, to the suppressor electrode of the electron discharge tube 146, the control electrode of which is connected via resistors 147, 148 and 149 in series to positive terminal 136 and the anode of which is connected to terminal 136 via a load resistor 150. The screen electrode of tube 146 is connected to ground via a condenser 151, the cathode being connected directly to ground. The screen electrode is also connected via the resistor 152 to positive terminal 136. Tube 146 operates in conjunction with the condenser 153 to integrate the pulses applied to it and said pulses are fed to the cathode of a diode 154, the output comprising a sawtooth voltage wave at line frequency. A square wave at frame frequency derived for example from a multivibrator similar to that formed by tubes 12 and 13 of Figure 2 or derived from any other suitable source represented by terminal 155 is fed via a condenser 156 to a counter-circuit comprising diodes 157 and 158. The voltage appearing across the cathode resistor 159 of diode 158 is of stepped waveform and is fed via a shunt condenser 160 and grid resistor 161 to the control electrode of a pulse generator comprising a pair of electron discharge tubes 162 and 163 which are disposed within a common envelope and have a common cathode provided with a cathode resistor 164 connected to negative terminal 165. The anode of tube 162 is connected via resistors 166 and 167 to positive H. T. terminal 136 and the anode of tube 163 is connected to terminal 136 via a resistor 168 and resistor 167, a by-pass condenser 169 being provided. The anode of tube 162 is connected via condenser 170 and grid resistor 171 to the control electrode of tube 163 the junction of condenser 170 and resistor 171 being connected to ground via a variable resistor 172 and a condenser 173, and the junction of resistor 172 and condenser 173 is connected to an adjustable tapping on a resistor 174 connected in series with a resistor 175 between positive terminal 136 and ground. The tubes 162 and 163 operate as a pulse generator which is arranged to operate after each two cycles of the square wave voltage applied to terminal 155 and which provides a large negative pulse which is fed via a condenser 176 and a shunt resistor 177 to the suppressor electrode of an electron discharge tube 178. The control electrode of this latter tube is connected via resistors 179, 180 and 181 to positive terminal 136, to which the anode is connected via a load resistor 182, a condenser 183 connecting said anode with the junction of resistors 179 and 180. The screen electrode of tube 178 is connected via a resistor 184 to terminal 136 and to ground via a condenser 185, the cathode being connected directly to ground. The tube 178 operates as an integrating circuit which is periodically cut off by the above-mentioned large negative pulses and since said pulses occur at half the frame frequency tube 178 provides a sawtooth waveform at frequency $f/n$, where $f$ is the frame frequency and $n$ is the number of frames per picture. In the case described the sawtooth voltage is of half frame frequency. The anode of tube 178 is connected to the anode of diode 154 via a resistor 186 which serves as the load resistor of diode 154. It will be seen therefore that there is applied to the cathode of diode 154 a sawtooth voltage at line frequency and that a sawtooth voltage of half frame frequency is applied to the anode of diode 154. Accordingly the effective bias applied to diode 154 varies continuously, and periodically the values of the two sawtooth voltages will become equal and will cause the diode to conduct momentarily thereby providing a pulse across the load resistor 186. Due to the aforesaid frequencies of the two sawtooth voltages the pulses provided by diode 154 will occur at line frequency but the timing of said pulses varies slowly and in a progressive manner so as to change to the extent of one line period during one complete picture. As a result of the change in timing, these pulses, which have a frequency corresponding substantially to the line frequency, can be employed to synchronize each frame of a complete picture. Said pulses are differentiated by a differentiating circuit formed by condenser 187 and a resistor 188 and are rectified by a diode 189 in order to eliminate undesired pulses which may be generated during flyback periods of the line frequency sawtooth voltage. The anode of diode 189 is connected to ground via a resistor 190 and the output may be applied to a gating device corresponding to the gating device 4 of Figure 1 and formed for example by an arrangement similar to that formed by tubes 41 and 45 of Figure 2. The arrangement of Figure 4 may for example be similar to that of Figure 2 with the exception of the above described arrangement for producing the two trains of pulses at line frequency.

With the arrangements such as described in Figures 3 and 4 employing either a plurality of electron discharge tubes (diodes 116 and 117 of Figure 3) for generating the control pulses corresponding to the lines of the even and odd frames or a single electron discharge tube (diode 154 of Figure 4) for generating a single train of pulses at line frequency but with changing timing the invention may readily be applied to receivers for use in television systems in which more than two frames are employed for reconstituting each picture, as may be the case in a colour television system. Assuming for example that four frames are to be employed, it is only necessary in the case of Figure 3 to employ four differently biassed diodes instead of the two diodes 116 and 117 which become operative in turn to provide pulses, or in the case of Figure 4 the pulse generator formed by tubes 162 and 163 may be arranged to operate after each four cycles of the square wave applied to the countercircuit comprising the diodes 157 and 158.

What I claim is:

1. Television receiving apparatus for reconstituting interlaced pictures under the control of line and frame synchronizing pulses, comprising means for generating derived pulses having a frequency corresponding substantially to line frequency, means for controlling the generation of said derived pulses by said line synchronizing pulses, gating means comprising a unidirectionally conducting device normally biassed to non-conducting condition, an input circuit, an output circuit and a control circuit, all connected to said device to transmit pulses from said input circuit to said output circuit in response to operation of said control circuit; means for feeding frame synchronizing pulses to the control circuit of said gating means, means for feeding said derived pulses to the input circuit of said gating means to generate in said output circuit frame scan control signals upon the coincidence of said derived pulses and said frame synchronizing pulses, a frame deflection circuit, means for feeding said frame scan control signals from said output circuit to said deflecting circuit, and means for modifying the relative timing of said derived pulses in successive frames so as to generate said frame scan control signals with such a timing as to ensure correct reproduction of said interlaced pictures.

2. Television receiving apparatus for reconstituting interlaced pictures under the control of line and frame synchronizing pulses, comprising means for generating separate series of derived pulses each having a frequency corresponding substantially to line frequency, and of different time phasing, means for controlling the generation of said derived pulses by said line synchronizing pulses, a gating device comprising a unidirectionally conducting element means normally biassing said element to non-conducting condition and an input circuit, an output circuit and a control circuit, all connected to said element to transmit pulses from said input circuit to said output circuit in response to operation of said control circuit to decrease the bias of said element; means for feeding frame synchronizing pulses to the control circuit of said gating device, means for feeding said derived pulses to the input circuit of said gating device to generate in said output circuit frame scan control signals on the coincidence of said derived pulses and frame synchronizing pulses, a frame deflection circuit, means for feeding said frame scan control signals from said output circuit to said deflecting circuit, and means controlled by said frame synchronizing pulses for selectively applying derived pulses alternately of said separate series to said gating device input circuit, during successive frame periods, so as to generate said frame scan control signals with such a timing as to ensure correct reproduction of said interlaced pictures.

3. Television receiving apparatus for reconstituting interlaced pictures under the control of line and frame synchronizing pulses, comprising means for deriving derived pulses having a frequency corresponding to line frequency, means for controlling the generation of said derived pulses by said line synchronizing pulses, a gating device comprising a unidirectionally conducting element, means for feeding frame synchronizing pulses to said gating device, means for modifying the timing of said derived pulses, said modifying means comprising means for generating from said derived pulses a plurality of trains of pulses with the pulses in one train having a different timing compared with the pulses in another train, a path for one of said trains of pulses including a further gating device, another path for another train of said pulses including another gating device, means connecting said paths to said first-mentioned gating device, a frame deflecting circuit connected to said first-mentioned gating device, a switch connected to the gating device in each of said paths, and means controlling the operation of said switch from said frame deflecting circuit to cause the gating devices in said paths to be operated sequentially to feed pulses from one or other of said trains to said first-mentioned gating device to generate frame scan control signals on the coincidence of one of said pulses of a train and a frame synchronizing pulse, said trains of pulses having a relative timing to ensure correct reproduction of said interlaced pictures.

4. Television receiving apparatus for reconstituting interlaced pictures under the control of line and frame synchronizing pulses, comprising means for deriving derived pulses having a frequency corresponding to line frequency, means for controlling the generation of said derived pulses by said line synchronizing pulses, a gating device comprising a unidirectionally conducting element, means for feeding frame synchronizing pulses to said gating device, means for modifying the timing of said derived pulses, said modifying means comprising a plurality of unidirectionally conducting devices corresponding to the number of frames of said picture, means for differently biassing said unidirectionally conducting devices, a source of sawtooth voltage synchronous with received line synchronizing pulses, means for applying to said unidirectionally conducting devices said sawtooth voltage to change the conducting conditions of said unidirectionally conducting devices to generate a plurality of trains of pulses with the pulses in one train having a different timing compared with the pulses in another train, means for sequentially feeding pulses from one or other of said trains to said gating device to generate frame scan control signals on the coincidence of one of said pulses of a train and a frame synchronizing pulse, a frame deflecting circuit, and means for feeding said frame scan control signals to said deflecting circuit, said trains of pulses having a relative timing to ensure correct reproduction of said interlaced pictures.

5. Television receiving apparatus for reconstituting interlaced pictures under the control of line and frame synchronizing pulses, comprising means for deriving derived pulses having a frequency corresponding substantially to line frequency, means for controlling the generation of said derived pulses by said line synchronizing pulses, a gating device comprising a unidirectionally conducting element, means for feeding frame synchronizing pulses to said gating device, means for feeding said derived pulses to said gating device to generate frame scan control signals on the coincidence of one of said derived pulses and a frame synchronizing pulse, a frame deflecting circuit, means for feeding said frame scan control signals to said deflecting circuit, and means for continuously varying the timing of said derived pulses in a progressive manner to change to the extent of one line period during one complete picture, thereby to generate said frame scan control signals with a timing to ensure correct reproduction of said interlaced pictures.

6. Television receiving apparatus for reconstituting interlaced pictures under the control of line and frame synchronizing pulses, comprising means for deriving derived pulses having a frequency corresponding substantially to line frequency, means for controlling the generation of said derived pulses by said line synchronizing pulses, a gating device comprising a unidirectionally conducting element, means for feeding frame synchronizing pulses to said gating device, means for feeding said derived pulses to said gating device to generate frame scan control signals on the coincidence of one of said derived pulses and a frame synchronizing pulse, a frame deflecting circuit, means for feeding said frame scan control signals to said deflecting circuit, a unidirectionally conducting device, a source of sawtooth voltage of line frequency, a source of sawtooth voltage of frequency $f/n$ where $f$ is the frame frequency and $n$ the number of frames per picture, means for applying said sawtooth voltages respectively to different electrodes of said unidirectionally conducting device to cause said unidirectionally conducting device to generate derived pulses the timing of which changes in a progressive manner to the extent of one line period during one complete picture, thereby to generate said frame scan control signals with a timing to ensure correct reproduction of said interlaced pictures.

References Cited in the file of this patent

UNITED STATES PATENTS

| | | |
|---|---|---|
| 2,181,572 | Bowman-Manifold et al. | Nov. 28, 1939 |
| 2,491,804 | Fleming et al. | Dec. 20, 1949 |
| 2,492,943 | White | Dec. 27, 1949 |
| 2,515,613 | Schoenfield | July 18, 1950 |
| 2,519,911 | Kuperus | Aug. 22, 1950 |